(12) United States Patent
Chiang

(10) Patent No.: US 6,263,788 B1
(45) Date of Patent: Jul. 24, 2001

(54) FOOD EXTRUSION APPARATUS

(76) Inventor: Chin-Ta Chiang, No. 3, Lane 267, Ho-Ping Rd., Ton-Tzu Hsiang, Taichung Hsien (TW)

( * ) Notice: Subject to any disclaimer, the term of this patent is extended or adjusted under 35 U.S.C. 154(b) by 0 days.

(21) Appl. No.: 09/779,514

(22) Filed: Feb. 9, 2001

(51) Int. Cl.⁷ .............................. A21C 3/06; A21C 9/00; A21C 11/00; A23P 1/00; A21D 6/00
(52) U.S. Cl. .................. 99/450.2; 99/353; 99/450.1; 425/92; 425/115; 425/237; 425/321; 425/325; 425/362
(58) Field of Search ................. 99/353, 450.1–450.8, 99/494, 355; 425/321, 322, 297, 325, 329, 335, 391, 92, 115, 133.1, 131.3, 112, 237, 362, 408; 426/231, 285, 283, 500–503, 512, 496

(56) References Cited

U.S. PATENT DOCUMENTS

| | | | |
|---|---|---|---|
| 4,517,785 | * | 5/1985 | Masuda ................................ 99/450.6 |
| 4,608,918 | * | 9/1986 | Funabashi et al. ............. 99/450.7 X |
| 4,692,109 | * | 9/1987 | Hayashi et al. ....................... 425/308 |
| 4,734,024 | * | 3/1988 | Taashiro ................................ 425/132 |
| 4,806,087 | * | 2/1989 | Hayashi ................................ 99/450.6 |
| 4,832,961 | * | 5/1989 | Aoki ..................................... 99/450.7 |
| 4,883,678 | * | 11/1989 | Tashiro ............................. 426/503 X |
| 5,081,917 | * | 1/1992 | Masuda ................................ 99/450.2 |
| 5,098,273 | * | 3/1992 | Tashiro ................................ 425/132 |
| 5,153,010 | * | 10/1992 | Tashiro ................................ 425/287 |
| 5,156,869 | * | 10/1992 | Otsuki ................................. 426/237 |
| 5,190,770 | * | 3/1993 | Tashiro ............................ 425/142 X |
| 5,290,577 | * | 3/1994 | Tashiro ................................ 99/445.6 |

* cited by examiner

Primary Examiner—Timothy F. Simone
(74) Attorney, Agent, or Firm—Bacon & Thomas, PLLC

(57) ABSTRACT

An improved food extrusion apparatus includes a main body which has two or more rollers to form a squeezing space therebetween, a funnel located at the top end of the main body above the squeezing space and a conveyor located at the bottom end of the main body below the squeezing space. The roller has a plurality of equally spaced teeth formed on the peripheral surface thereof for squeezing a dough feeding from the funnel into the squeezing space to form troughs on the dough. The main body also has a pair of rollers which has smooth peripheral surface to smooth the dough from the squeezing space. The dough thus formed has less area subject to the squeezing force of the roller and will result in resilience in the dough for producing better taste food products.

3 Claims, 4 Drawing Sheets

FOOD EXTRUSION APPARATUS

BACKGROUND OF THE INVENTION

This invention relates to a food processing machinery and particularly an extrusion apparatus for processing food.

Various types of food processing machinery are available on the market for producing different types of food. FIG. 1 illustrates a commonly used extrusion apparatus 2 for producing dough. It has a funnel 1 at the top for holding dough to be processed and a plurality of rollers 4 located below the funnel 1 to form a squeezing space 2. The rollers 4 are driven by a motor to squeeze the dough dropping down from the funnel 1. The squeezed dough is carried away by a conveyer located below the rollers 4. The rollers 4 usually are formed in cylindrical shapes and have smooth peripheral surfaces. The dough held in the squeezing space is being extruded between the rollers by constant and even force and lots of air is squeezed out of dough. The resulting squeezed dough becomes a relatively hard slat with little resilience. Food produced by such a dough do not have desirable taste. There is still rooms for improvement.

SUMMARY OF THE INVENTION

It is therefore an object of this invention to provide an improved food extrusion apparatus that has a plurality of equally spaced teeth formed at the peripheral surface of the rollers so that the dough will be squeezed between the rollers at a smaller area thereby to reduce the stress transferred from the rollers. As a result, the produced dough will have desirable resilience and keep more air inside dough and may produce more tasteful food.

Another object of this invention is to provide a food extrusion apparatus that has adjustable roller number for processing different quantity of dough whereby to increase processing speed.

To attain the foregoing objects, the extrusion apparatus according to this invention includes a main boy which has two or more rollers to form a squeezing space therebetween. There is a funnel located at the top end of the main body above the squeezing space for holding and feeding the dough to be processed. And there is a conveyor located at the bottom end of the main body below the squeezing space for transporting the processed dough. The rollers have teeth formed at the peripheral surface so that the dough fed into the squeezing space during the process will be squeezed to form a plurality of troughs which will result in less dough surface subject to the roller squeezing force and consequently reduce the stress transferred from the rollers to the dough and the dough have more space. There is a pair of smooth rollers at the bottom end of the main body to extrude the dough to a smooth slat for producing finished food products. The dough thus formed has resilience desired. The resulting finished food products will have more air inside and have better texture and taste.

BRIEF DESCRIPTION OF THE DRAWINGS

The invention, as well as its many advantages, may be further understood by the following detailed description and drawings.

DESCRIPTION OF THE PREFERRED EMBODIMENTS

Figure 1:
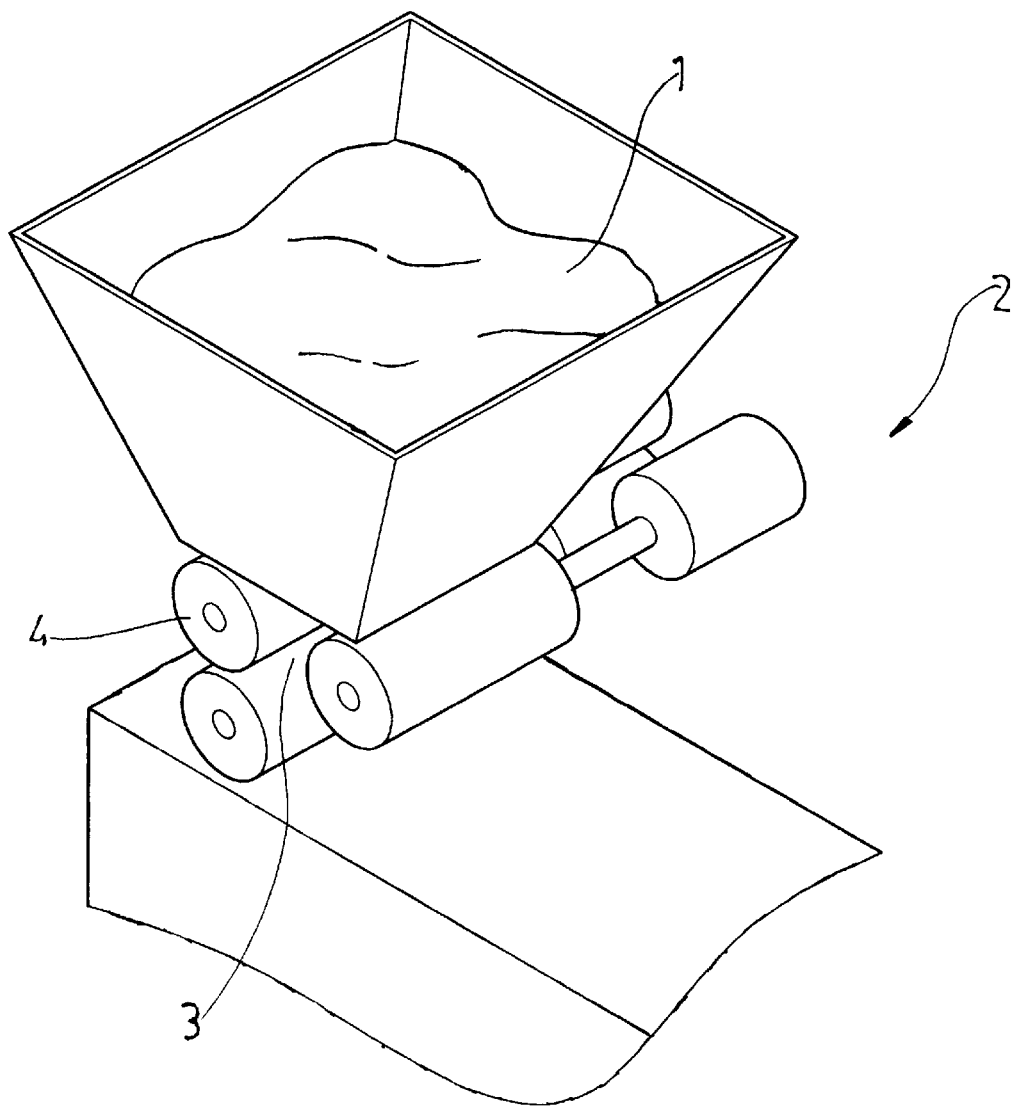
FIG. 1 is a schematic view of a conventional extrusion apparatus for food process.
Figure 2:
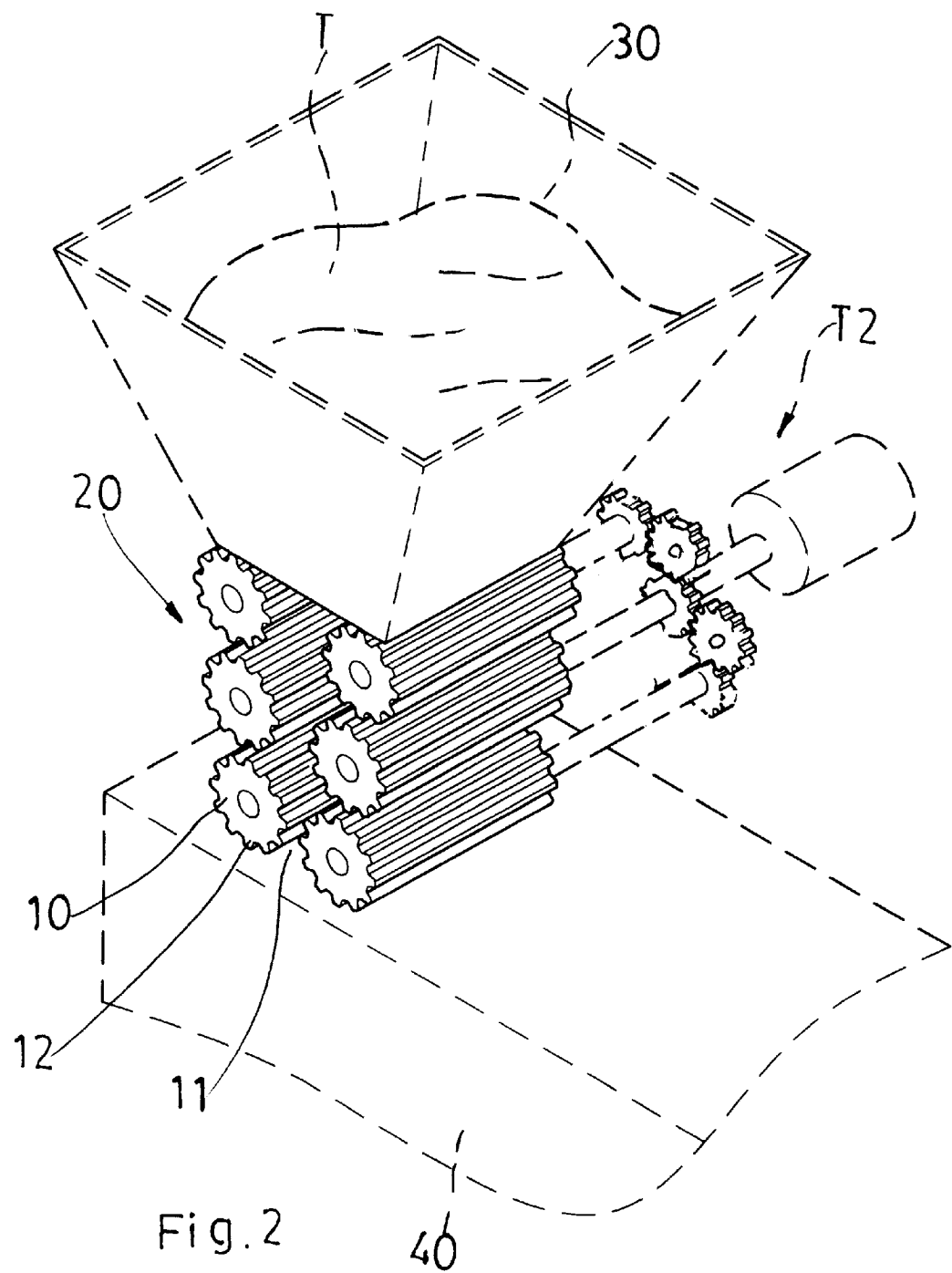
FIG. 2 is a perspective of this invention.

Referring to FIG. 2, the extrusion apparatus of this invention includes a main body 20 which constitutes one or more pair of rollers 10 (three pairs have been shown in the embodiment). Each pairs of the rollers 10 form a squeezing space 11 therebetween. There is a funnel 30 located at the top end of the main body 10 above the squeezing space 11. At the bottom end of the main body 20 below the squeezing space 11, there is a conveyor 40.

The dough T to be processed is put into the funnel 30 and drops into the squeezing space 11 to be extruded, then be discharged and carried away by the conveyor 40.

Figure 3:
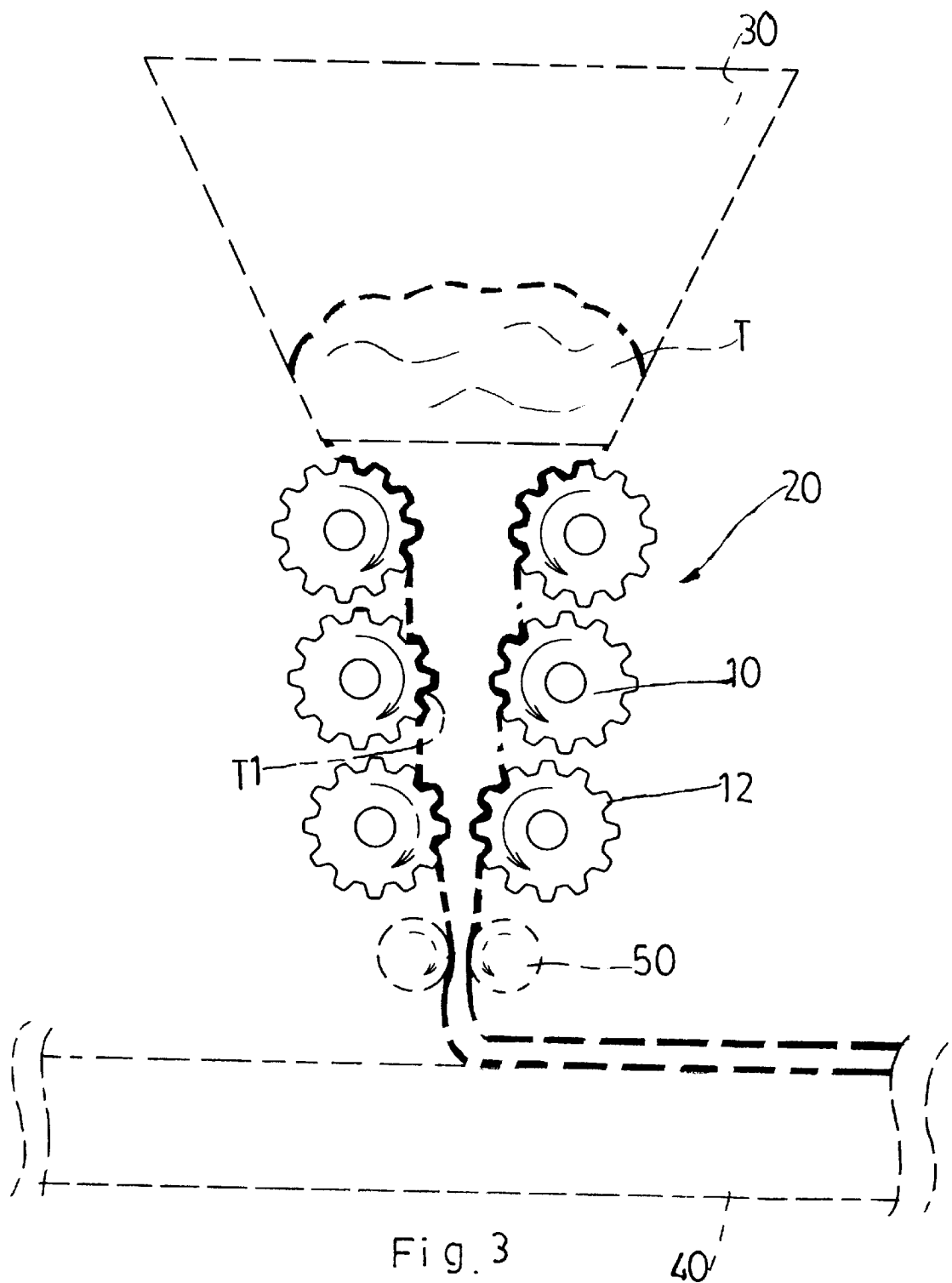
FIG. 3 is schematic side view of this invention.

Referring to FIG. 3, each roller 10 of this invention has a plurality of equally spaced teeth 12 formed at the peripheral surface.

When in use, the dough T is fed from the funnel 30 into the squeezing space 11 and be squeezed by the teeth 12 of the rollers 10. The dough T is squeezed by the teeth 12 and the peripheral surface of the rollers 10 and will form troughs T1 because of the teeth 12. Only the dough located at the bottom of the troughs T1 will receive the extrusion force from the rollers 10. The force receiving area on the dough T thus is smaller and may result in less stress on the dough. The dough thus formed has resilience. At the bottom of the main body 20 below the squeezing space 11, there is a pair of rollers 50 which have smooth peripheral surface like conventional ones. The squeezed dough coming out of the squeezing space 11 is extruded by the rollers 50 to form a finished dough of smooth surface but still maintains the resilience. The food products produced by such a dough will have resilience and taste better. Behind the main body 20, there is a rotation means T2 for driving the rollers 10. (The rotation means T2 used in the invention includes motor and belt which are known in the art and will be omitted herein). Referring to FIG. 3, when the rollers 10 at the left hand side rotate clockwise, the rollers 10 at the right hand side rotate counterclockwise. The rollers 10 at the two sides are always rotating at opposite directions, thus are able to discharge the processed dough T from the squeezing space 11 downward to the conveyor 40.

Figure 5:
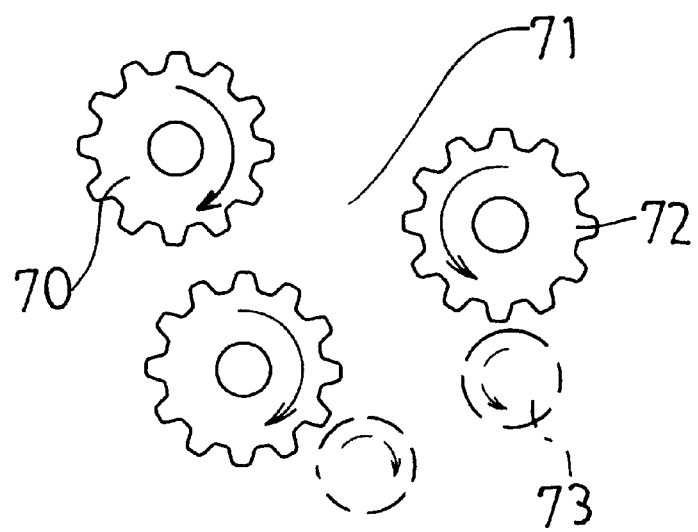
FIG. 5 is a fragmentary schematic view of yet another embodiment of this invention.
Figure 4:
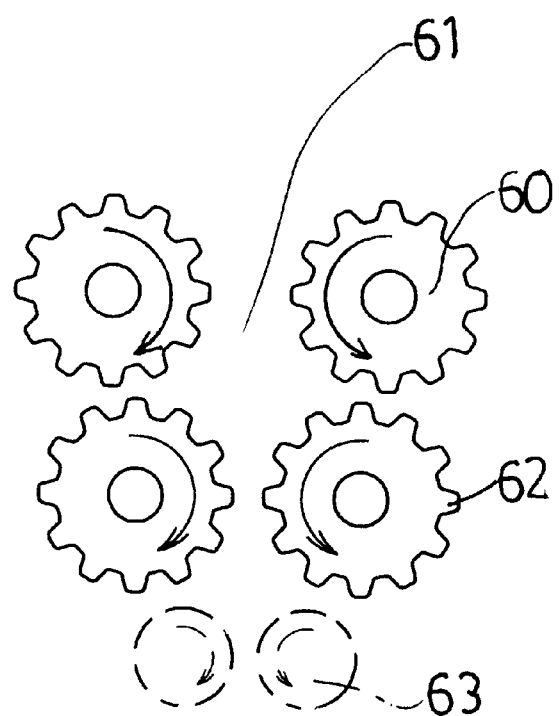
FIG. 4 is a fragmentary schematic view of another embodiment of this invention.

FIGS. 4 and 5 show other embodiments of this invention which include respectively four sets of rollers 60 and three sets of rollers 70. All other constructions are substantially same as the embodiment shown in FIG. 3, hence details will be omitted herein. The dough T is feeding from the funnel into the squeezing space 61 or 71 and is squeezed by the teeth 62 or 72 of the rollers 60 or 70 to form troughs T1 on the dough like the one shown in FIG. 3. Then the dough T is smoothed by a pair of conventional rollers 63 or 73 before discharging. The number of rollers 10, 60 and 70 and their configuration may be arranged in various fashions depend on requirements.

What is claimed is:

1. A food extrusion apparatus, comprising:
   a main body including a plurality of roller sets to form a squeezing space therebetween;
   a funnel located at the top end of the main body above the squeezing space for feeding a dough into the squeezing space; and
   a conveyor located at the bottom end of the main body below the squeezing space for carrying the dough away after being squeezed in the squeezing space;

wherein the main body includes three pairs of roller set, each roller having a plurality of equally spaced teeth formed on the peripheral surface thereof for squeezing the dough to form a plurality of troughs thereon to reduce force receiving area on the dough whereby to lower stress transferred from the rollers to the dough and result in resilience in the dough.

2. The food extrusion apparatus of claim 1, wherein the main body includes two pairs of roller sets.

3. The food extrusion apparatus of claim 1, wherein the main body includes three rollers.

* * * * *